Feb. 14, 1939.  K. NUCHTERLEIN  2,147,106
ROLL FILM CUSHION
Filed Sept. 28, 1937
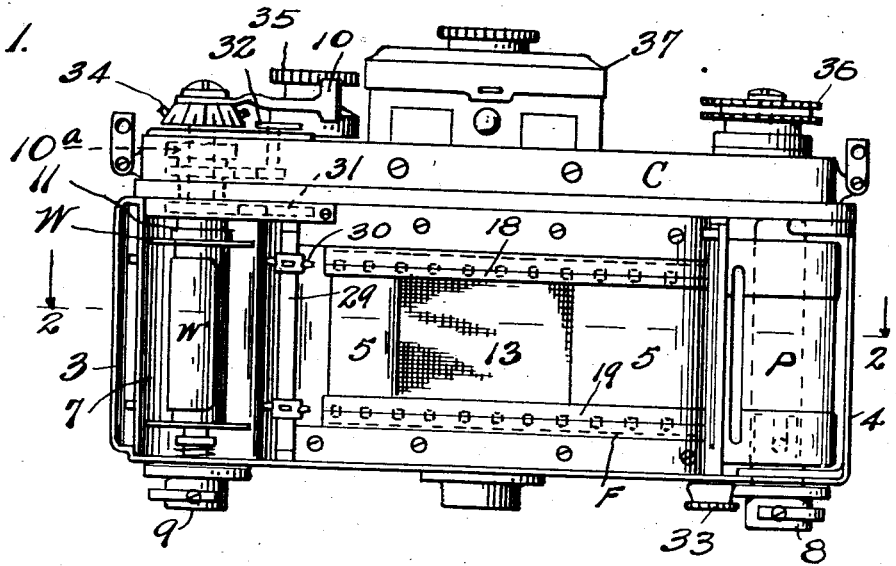
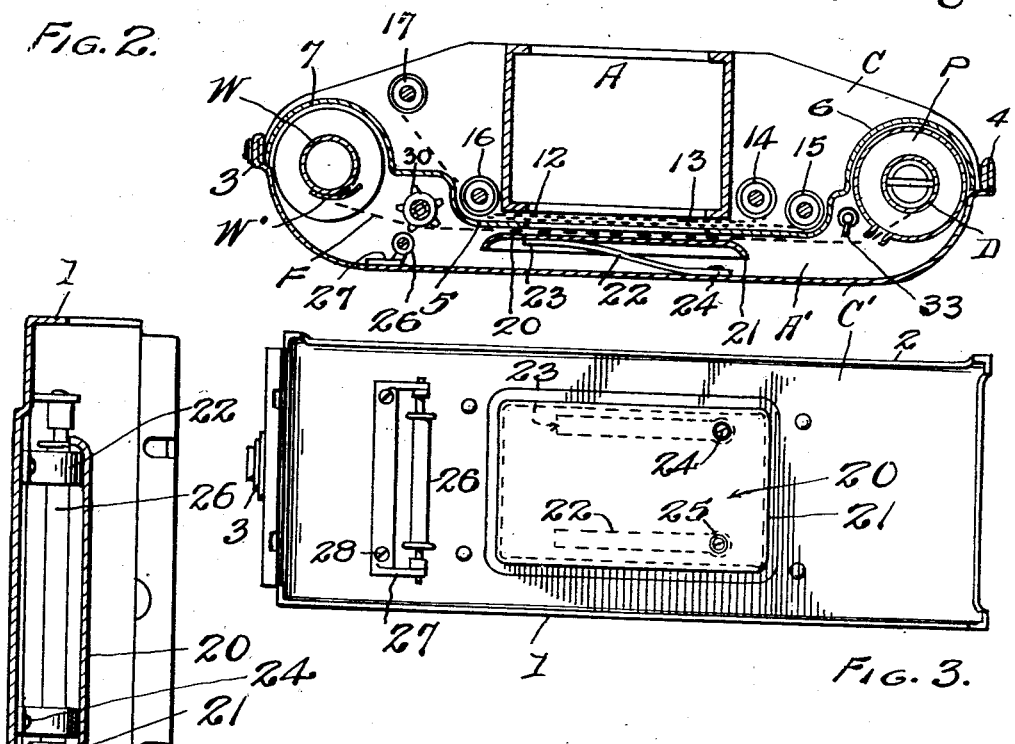
Inventor
KARL NUCHTERLEIN
By Chas. K. Davies & Son
Attorney Patented Feb. 14, 1939

2,147,106

UNITED STATES PATENT OFFICE 2,147,106

ROLL FILM CUSHION

Karl Nuchterlein, Dresden, Germany, assignor to Ihagee Kamerawerk Steenbergen & Company, Dresden, Germany Application September 28, 1937, Serial No. 166,204

4 Claims. (Cl. 95—31)

My present invention relates to improvements in roll-film cushions for cameras of the roll-film and curtain-shutter type, and which cameras include a light-chamber for picture-taking and a dark-chamber for "day-light" rewinding of the roll-film, with its latent images, into a standard film-pack having a daylight spool therein.

While my invention is adapted for use in various types of cameras, I have herein illustrated its embodiment in a miniature reflex camera, employing a roll film with thirty-six exposures, which film is advanced or fed, step by step, past openings between the light-chamber and the dark-chamber of the camera. In connection with this movement of the film I utilize a resiliently supported cushion-guide in the nature of a presser-plate, for retaining the picture-taking portion of the stationary film in required position for an exposure, and this resilient cushion or guide, in connection with other features or elements co-acting therewith, assist in the winding movement of the film to hold it taut, and to prevent buckling thereof.

The invention consists in certain novel combinations and arrangements of parts as will hereinafter be more fully set forth and claimed. In the accompanying drawing I have illustrated one complete example of the physical embodiment of my invention wherein the parts are combined and arranged in accordance with one mode I have devised for the practical application of the principles of my invention. It will be understood that changes and alterations may be made in these exemplifying structures, within the scope of my appended claims, without departing from the principles of the invention.

Figure 1 is an elevation at the rear of a camera, with its detachable back-plate removed to disclose the interior of the dark-chamber for the camera, showing also a portion of a shutter-curtain, a standard type of film-pack with its daylight spool, the film-winding spool, and the winding mechanism for the winding spool.

Figure 2 is a horizontal, sectional, detail view of part of the camera, as seen at line 2—2 of Figure 1, disclosing the dark-chamber and the light-chamber, the film-pack and winding spool, and indicating by dotted lines the roll-film and shutter curtains, together with the cushion-guide and accessories for the film as it passes across the back or rear light-opening of the camera.

Figure 3 is an inner face view of the detachable back-plate of the camera, in position as turned down from the camera of Figure 1, and showing the film guiding means mounted on the back-plate.

Figure 4 is an enlarged, transverse vertical sectional view through the back-plate and its accessories, showing the plate in position when attached to the camera, and looking to the left in Figure 1.

The camera is fashioned with an enclosing casing C, which is provided with a quick detachable back-wall or back-plate C' having bottom and top flanges 1 and 2 respectively that overlap the edges of the casing C, and the ends of the back-plate are provided with suitable attaching means or fasteners indicated at 3 and 4, for co-action with complementary fastening means at the ends of the casing C. These fastenings may readily be released for removal of the back-plate or detachable back-wall in order that a standard film-pack P with its daylight spool D may be loaded into, or unloaded from the dark-chamber located at the rear of the camera. The back-plate forms one wall of this dark-chamber, and an interior partition 5 forms the remaining enclosure for the dark-chamber. Semi-circular compartments 6 for the film-pack P, and 7 for the winding-spool W are located at the opposite ends of the dark-chamber, and the roll-film F is fed from right to left in Figures 1 and 2 and it is wound upon the spool W. The film, with its latent images, may also be re-wound from left to right, i. e. from the spool W to the spool D within the pack P, preparatory to removal of the exposed film from the dark-chamber.

The outer end of the film is attached to the spool W by means of a friction plate or shield W', and suitable exterior winding-heads 8 and 9 for the spool D and spool W respectively, are located at the bottom of the camera for manual operation in the preliminary arrangement of the film, as well as for rewinding the film with its latent images back into the film-pack.

In using the camera, the film F is advanced step by step through the turning of a winding-lever 10 located at the top left end of the camera, which lever turns a winding-head enclosed within the casing C, and the winding-head is coupled at 11 with the winding-spool W as indicated in Figure 1.

As illustrated in Figure 2, the first or opening-curtain 12, and the second or closing-curtain 13, which together form the shutter, pass through a vertical plane or space located between the light-chamber A at the center of the camera, and the dark-chamber A' at the rear of the camera and extending from end to end thereof. This space is formed between the back wall of the chamber A which has an exposure or light-opening therethrough, and the central portion of the partition 5 which also has a complementary light-opening therethrough. In Figure 1 a portion of the shutter-curtain 13 may be seen through the light-opening in the partition, and the film F which is shown by dotted lines passes along the outer face of the partition while the curtain passes in opposite direction along the inner side of the partition.

The first curtain to be operated when an exposure is made, here referred to as the opening-curtain 12 is mounted at one end on an automatic spring-wound curtain-roller 14, and the second or closing curtain 13 at one end is mounted on another automatic spring-wound curtain-roller 15, and these rollers are journaled in inner frame members or plates of the casing C. Each of the shutter-curtains is provided with an upper tape and a lower tape extending longitudinally thereof, and these pairs of tapes form openings in the curtains that provide the exposure slots of the shutter so that the light rays may pass from the light-chamber A through the light-opening in its back-wall. Then the light rays pass through the shutter slots, and thence through the light-opening in the partition 5, to make an exposure of that portion only of the film F that is thus presented to the light rays.

The shutter-curtains are unwound from their spring curtain-rollers 14 and 15 onto the shutter-setting rollers 16 and 17 by a turn of the winding lever 10 when it advances the film, and this swinging movement of the lever is translated into rotary movement of the winding-head indicated by dotted lines at 10a in Figure 1, through transmission-gears (not shown) to the setting rollers 16 and 17.

When suitable picture-taking mechanism (not shown) is operated to take a picture, the rollers 16 and 17 are released and the automatic curtain-rollers 14 and 15 wind the curtains from their respective setting rollers 16 and 17. These curtain-rollers 14 and 15 are located at one side of and exterior to the light-chamber A and they are also outside of the dark-chamber A', and in making an exposure the curtain 12 and 13 flash successively to the right in Figures 1 and 2, with the slot of the second curtain following the slot of the first curtain to make the exposure.

As indicated in Figure 2 the film F is advanced from its pack P at the right, to the winding spool W at the left, and it passes across the dark chamber A' with its upper and lower edges in sliding or gliding contact with the upper and lower horizontal metal strips 18 and 19 on the face of the partition 5, and these strips define the top and bottom walls of the light-opening in the partition.

For retaining that portion of the film which is exposed to receive the image, against the partition, I provide a resiliently supported cushion-guide that includes a smooth, rectangular, presser-plate 20, fashioned with curled edges or curved flanges 21 to protect the film F. This plate is larger in dimensions than the light opening of the partition 5, and the plate is designed to press that portion of the film, which is to be exposed, flat and closely against the guide strips 18 and 19 and the partition 5 surrounding the light opening in the partition.

This presser plate is permanently mounted on the inner face of the back-plate C', and of course it is removed from the camera when the back-plate is detached. The presser-plate is resiliently mounted on the inner face of the back-plate by means of two spaced, horizontal, spring-blades 22, 22, one end of each blade being welded, brazed, or otherwise secured to the back-plate as at 23, and the other end of each blade is secured as by a screw 24 to the back-plate C'. Openings 25 in the presser-plate are provided to admit a screw driver for securing these blades to the back-plate.

On the inner face of the removable back-plate C' is also permanently mounted an idling guide roller 26 journaled in a bracket 27 that is attached by screws 28 to the back-plate, and this idling guide roller is spaced a suitable distance from the presser-plate for co-action with a driven guide roller 29 mounted in the dark-chamber A' of the casing C.

The driven roller 29 is provided with a pair of toothed gears or sprockets 30, 30 that fit into the perforations in the upper and lower edges of the film F, and the film is passed between and guided by the roller 26 and sprockets 30 as it is advanced to the winding spool W. The film is also guided by these accessories from the spool W to the presser-plate, as the film with its latent images is being re-wound into the daylight spool D of the pack P.

In both the movements of winding and re-winding of the film, it is held taut and prevented from buckling, by means of the resilient cushion and the guide roller and sprockets, in connection with the daylight spool D and the winding spool W.

The guide roller 29 is driven from the drive-head 10a, as indicated by the dotted transmission gears 31 in Figure 1, as the winding spool W also is rotated through the driving-head, by a swing of the lever 10. The winding spool W and the roller 29 are held stationary after the film has been fed or advanced a step by the swinging movement of the lever 10, but the lever automatically returns to its normal position. Therefore, to permit rewinding of the film with its latent images from the spool W to the pack P a reverse key 32 is turned (see Fig. 1) to release the spool and roller 29 from the winding head or drive-head 10a, and then by turning the manually rotated head 8 the film may be re-wound into the pack P.

Other accessories and auxiliaries are illustrated in the drawing, such as a knife or cutter 33, an exposure indicator 34, time-setting devices as 35 and 36, and an unfolding hood 37, but as these parts are not involved in the present invention they are not illustrated nor described in detail.

Having thus fully described my invention, what I claim as new and desire to secure by Letters Patent is:—

1. The combination in a camera having a light chamber, and an interior partition forming a dark-chamber, said chambers having light-openings, and spaced guide strips on, and projecting beyond, the partition for a film, of a resiliently supported cushion in the dark-chamber for pressing the edges of the film against said strips.

2. The combination in a camera with its casing and a detachable back-plate forming a dark chamber, of a resiliently supported cushion-guide mounted on the back plate, an idling guide-roller also mounted on the back plate and spaced from the cushion guide, and a driven guide roller journaled in the casing for coaction with said idling guide roller.

3. The combination in a camera with its casing and a detachable back-plate forming a dark-chamber, of a presser-plate for a film located in the dark chamber, a pair of spring-blades having their ends attached to the back-plate and the presser-plate, an idling guide roller also mounted on the back-plate and spaced from the presser-plate, and a driven guide roller journaled in the casing for co-action with said idling guide roller.

4. The combination in a camera having a light chamber, an interior partition, and a removable back plate, said partition and plate forming a dark chamber, said dark chamber having light openings, and spaced film guide strips on, and projecting from, said partition, of a presser plate adapted to maintain the film edges against the strips, a pair of spring blades having their end attached to the back plate and the presser plate, an idling film guide roller also mounted on the back plate and spaced therefrom, and a driven film guide roller mounted in the dark chamber.

KARL NUCHTERLEIN.